(12) United States Patent
Courtoy et al.

(10) Patent No.: US 7,090,910 B2
(45) Date of Patent: *Aug. 15, 2006

(54) SELECTIVELY EMBOSSED SURFACE COVERINGS AND PROCESSES OF MANUFACTURE

(75) Inventors: Jean-François Courtoy Courtoy, St-Bruno de Montarville (CA); René Ménard, Cowansville (CA); Victor Caldas, Cowansville (CA); Claude Charest, St-Bruno de Montarville (CA)

(73) Assignee: Domco Tarkett Inc., Farnham (CA)

( * ) Notice: Subject to any disclaimer, the term of this patent is extended or adjusted under 35 U.S.C. 154(b) by 157 days.

This patent is subject to a terminal disclaimer.

(21) Appl. No.: 10/321,617

(22) Filed: Dec. 18, 2002

(65) Prior Publication Data

US 2003/0138617 A1     Jul. 24, 2003

Related U.S. Application Data

(63) Continuation-in-part of application No. 10/046,019, filed on Jan. 11, 2002.

(51) Int. Cl.
*B32B 3/30*     (2006.01)

(52) U.S. Cl. ............. 428/158; 428/156; 428/141; 428/142; 428/161; 428/172; 428/173; 428/319.3; 428/319.7

(58) Field of Classification Search .......... 428/319.3, 428/304.4, 156, 158, 141, 142, 161, 172, 428/173
See application file for complete search history.

(56) References Cited

U.S. PATENT DOCUMENTS

| | | | |
|---|---|---|---|
| 3,458,337 A | 7/1969 | Rugg | |
| 3,887,678 A | 6/1975 | Lewicki, Jr. | |
| 4,142,849 A | 3/1979 | Lewicki, Jr. et al. | |
| 4,214,028 A | 7/1980 | Shortway et al. | |
| 4,298,646 A | 11/1981 | Haemer et al. | |
| 4,309,452 A | 1/1982 | Sachs | |
| 4,464,423 A | 8/1984 | LaBianca et al. | |

(Continued)

FOREIGN PATENT DOCUMENTS

DE     24 16 737.1     10/1974

(Continued)

OTHER PUBLICATIONS

International Searching Authority-International Search Report dated Nov. 5, 2003 relating to PCT/CA 03/00008.

*Primary Examiner*—Hai Vo
(74) *Attorney, Agent, or Firm*—Norris, McLaughlin & Marcus

(57) ABSTRACT

Selectivity embossed surface coverings are prepared by mechanically embossing a wear layer which overlays at least one printing ink containing a photoinitiator which has been printed in a pattern or design. The embossed wear layer is subjected to ultraviolet radiation which causes curing of the wear layer in the surface areas disposed over the printing ink. The product then is fused whereby the mechanical embossing in surface areas which are not disposed over the printing ink relaxes and becomes smooth. In a variant of the invention, a thermoplastic wear layer is employed which can be mechanically embossed in the surface areas which are not disposed over the printing ink with a texture different from the first applied mechanical embossing. In another variant, two different spectral regions of UV curing radiation are used so that a urethane coating can be employed as a top coat with a selectively embossed surface.

5 Claims, 2 Drawing Sheets

U.S. PATENT DOCUMENTS

| | | |
|---|---|---|
| 4,608,294 A | 8/1986 | Courtoy et al. |
| 4,617,222 A | 10/1986 | Courtoy et al. |
| RE33,069 E | 9/1989 | Courtoy et al. |
| RE33,599 E | 5/1991 | Courtoy et al. |
| 5,147,901 A * | 9/1992 | Rutsch et al. ............... 522/42 |
| 5,961,903 A * | 10/1999 | Eby et al. ................. 264/46.5 |
| 6,146,711 A | 11/2000 | Courtoy et al. |
| 6,555,216 B1 * | 4/2003 | Chen et al. .............. 428/322.7 |
| 6,613,256 B1 * | 9/2003 | Brossman et al. ......... 264/46.4 |
| 2001/0002293 A1 * | 5/2001 | Eby et al. |

FOREIGN PATENT DOCUMENTS

| | | |
|---|---|---|
| DE | 44 21 557 C1 | 8/1995 |
| DE | 198 42 510 A1 | 3/2000 |
| EP | 0 003 965 | 2/1979 |
| EP | 0 051 821 A1 | 10/1981 |
| GB | 2 193 469 A7 | 2/1988 |
| WO | WO 00/30869 | 6/2000 |

\* cited by examiner

SELECTIVELY EMBOSSED SURFACE COVERINGS AND PROCESSES OF MANUFACTURE

CROSS-REFERENCE TO RELATED APPLICATIONS

This application is a continuation-in-part of Ser. No. 10/046,019, filed Jan. 11, 2002.

BACKGROUND OF THE INVENTION

1. Field of the Invention

The present invention has to do with a process for manufacturing mechanically embossed synthetic surface coverings and the products obtained thereby. More particularly, the invention relates to floor coverings which are mechanically embossed and processed to create selectively embossed surface areas, thereby creating products having a more realistic appearance. These appearances include, for example, ceramic tile, stone, brick, sandstone, cork, wood, and in some embodiments textured lines or grout lines there between, as well as combinations thereof such as sandstone and ceramic tile, textured wood and smooth ceramic, cork and wood, and stone or slate in combination with ceramic tile.

2. Description of the Related Art

Synthetic surface coverings including sheet flooring, wall coverings and tile are employed in residential, commercial and institutional applications where decorative effects, durability and ease of installation and maintenance are important considerations. These surface coverings can be designed to imitate a variety of masonry materials such as ceramic tile, stone and brick or they can be designed with unique combinations of color, particles and other decorative features that are not available in other types of surface coverings. In the current marketplace, consumers are increasingly demanding synthetic surface coverings with improved textural features such as features which realistically imitate not only the textures of materials such as ceramic tile, stone, brick, sandstone, cork, wood and combinations thereof, but also the texture of the grout or mortar which typically is used by a mason or other craftsman to fill the joints between such materials to secure them in their desired position relative to one another.

The surface covering industry has employed mechanical embossing, chemical embossing, combinations of mechanical and chemical embossing, screen printing and other techniques for years in order to obtain design effects and textures which meet consumer demands. In U.S. Pat. No. RE. 33,599 a process is described for obtaining selective matting on synthetic coverings by depositing on an expandable or nonexpandable support substrate (1) a polymer coating which contains at least one first polymerization initiator onto at least a first selected zone and (2) at least one second coating comprised of a crosslinkable monomer which contains at least one second polymerization initiator onto at least a second selected zone. The second zone may encompass at least a portion of the first zone. The first and second initiators are triggered by distinct "spectral zones". Following pre-gelling, an overall graining operation is carried out over at least a portion of the surface followed by curing the first selected zone and thereby fixing the graining thereon. Then gelling is carried out to cause the graining in the second zone to smooth out. The product has a selectively matted appearance. Another method of making differential gloss products is described in U.S. Pat. No. 4,298,646.

The surface texture effects of the present invention are obtained by creating relatively deep emboss depths as compared with the shallow graining or dusting techniques employed to obtain the matted or differential gloss effects of the patents noted above. More specifically, the present invention is directed to the realistic imitation in surface coverings not only of the surface texture of a variety of masonry materials such as ceramic tile, stone, brick, sandstone, cork, wood and combinations thereof, but also in some embodiments to the realistic imitation of the surface texture of the grout or mortar in the joints between such materials.

SUMMARY OF THE INVENTION

In accordance with the present invention, a novel process is provided for obtaining selective areas of distinctive appearance, e.g., textured grout lines, on the surface of a synthetic surface covering. In one embodiment, to obtain such a product: a foamable plastic layer containing a foaming agent is applied over a sheet substrate. The combination is then heated to gel the plastic layer without activating the foaming agent. A first printing ink containing a photoinitiator is then applied in a first pattern on the gelled plastic layer. A second printing ink containing both an expansion inhibitor and a photoinitiator is then also applied to the gelled plastic layer in a second pattern, whereupon a portion of the inhibitor migrates into the gelled plastic layer. Following the printing steps, a liquid curable coating made from a plastisol or organosol and containing an ultraviolet ("UV") curable photopolymer, e.g. an acrylic monomer or oligomer, is applied over the entire surface of the gelled plastic layer, including the first and second printing inks, whereupon a portion of the photoinitiator in the printing inks migrates into the curable coating. The curable coating is then gelled, with or without a cooling step, followed by surface softening through the use of heat. The softened curable coating is then mechanically embossed overall with a texture, such as that imitating grout, whereupon the product is cured by exposure within an enclosure to UV radiation to set the grout texture in those portions of the curable coating overlying the printing inks, both of which contain a portion of the photoinitiator. Upon exiting the UV enclosure, the product enters a fusion and expansion oven wherein that portion of the curable coating which does not overlie the printing inks containing the photoinitiator smooths out such that the grout imitating texture disappears in those areas. Furthermore, those portions of the gelled plastic layer which do not contain the inhibitor applied with the second printing ink, foam and expand. The surface of the curable coating which has smoothed out may then optionally be mechanically embossed a second time but now with a texture which imitates the texture of stone, wood or the like as hereto before described. A performance coating like acrylic polyurethane is optionally applied to the surface of the product for additional protection against wear. As will be appreciated by one of ordinary skill in the art, more than two printing inks can be used in the process and product of the invention and each of the inks can optionally contain a photoinitiator and/or an inhibitor. Of course, printing inks which do not contain a photoinitiator or an inhibitor can be employed in combination with inks which do contain a photoinitiator and/or an inhibitor in order to obtain desired decorative effects.

In another embodiment of the invention, printing inks without inhibitors are printed in a pattern or design directly onto a substrate which does not have a foamable plastic layer. The resultant product has a flat surface with different textures or appearances including, in some instances, a three-dimensional appearance. In this embodiment, should textured grout lines be part of the pattern or design, the textured grout lines will be flush with the top surface of the product, i.e. without relief.

In still another embodiment of the invention, calendered and/or extruded sheets can be employed in place of the foamable and/or curable coatings as explained in the detailed description below.

A further embodiment of the invention employs printing inks and wear layers having different photoinitiators which react when exposed to UV radiation having different wavelengths to obtain selectively embossed surface coverings having a urethane surface coating.

All percentages set forth herein are by weight/weight unless otherwise specified.

DETAILED DESCRIPTION OF THE PREFERRED EMBODIMENTS

Figure 1:
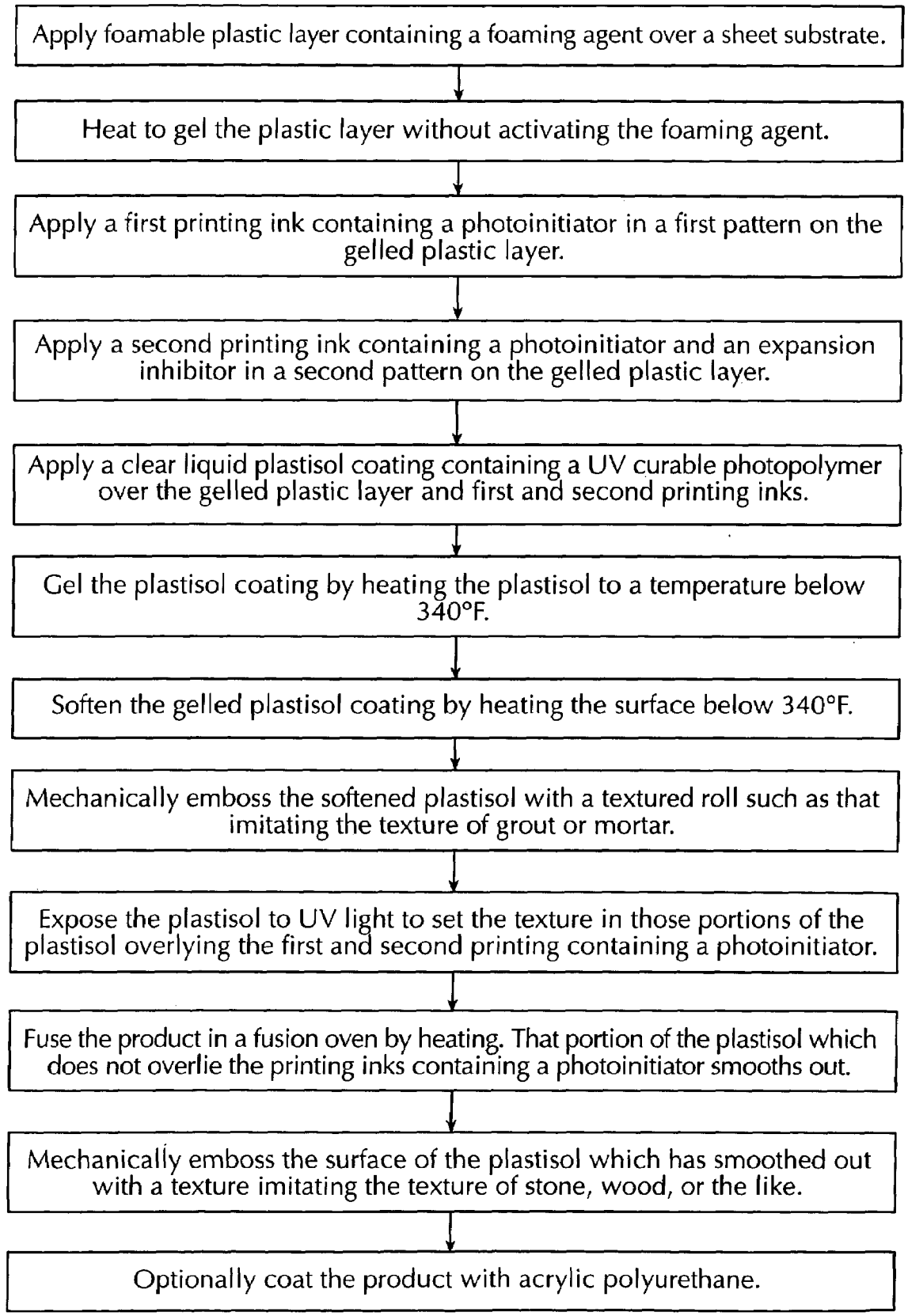
FIG. 1 is a flow diagram of a process of the invention.

Referring to FIG. 1, a foamable plastic layer containing a foaming agent is applied over a sheet substrate. The combination is then heated to gel the plastic layer without activating the foaming agent. A first printing ink containing a photoinitiator is then applied in a first pattern or design onto the gelled plastic layer using conventional techniques. A second printing ink containing an expansion inhibitor and a photoinitiator, e.g. an ultraviolet radiation polymerization initiator, is then applied to the gelled plastic layer in a second pattern or design, again using conventional techniques, whereupon the inhibitor present in the second printing ink migrates into the gelled plastic layer beneath the second printing ink. The inhibitor must be chosen so that the rate at which it will migrate from the second printing ink into the gelled plastic layer is compatible with the speed of the overall process of making the surface covering. It will be appreciated that the second ink pattern may advantageously be a joint between two tiles so as to imitate ceramic tiling. However, the present invention is not limited to such a design and may represent any desired design. It will also be appreciated that the terms "first printing ink" and "second printing ink" serve only to differentiate the inks and do not necessarily refer to the order in which they are applied to the gelled plastic layer or directly to the substrate neither does it imply that there are only two printing inks to achieve the desired product pattern in the desired colors.

A clear liquid curable coating containing a UV crosslinkable acrylic monomer or oligomer and optionally a thermal crosslinking initiator, e.g., a radical generator such as peroxide is next applied over the entire surface of the gelled plastic layer including the first and second printing inks. The photoinitiator residing in the first and second printing inks subsequently migrates into the curable coating which has been applied over the inks. The photoinitiator must be chosen so that the rate at which it will migrate from the printing inks into the curable coating is compatible with the speed of the overall process of making the surface covering. The combination of substrate, plastic layer, first and second printing inks, and liquid curable coating is then heated to gel the curable coating. The surface of the curable coating is then softened by heat whereupon the softened curable coating is mechanically embossed with an overall textured roll using conventional techniques. The textured roll preferably imitates the texture of sand, cementitious grout, mortar, cork, terrazzo or the like as hereto before described. The time and temperature required for the gelling process must be sufficiently low in order not to initiate thermal crosslinking of the curable coating at these temperatures. If a thermal crosslinking initiator is not used, electron beam crosslinking techniques or others as will be described in the examples can be employed as known by those skilled in the art.

To fix the embossed texture in those areas of the curable coating overlying the first and second printing inks containing the photoinitiator, the curable coating containing the UV curable acrylic monomer or oligomer is crosslinked with ultraviolet radiation within an enclosure. The UV radiation decomposes the photoinitiator so as to form free radicals or ions which are needed for crosslinking the monomer and/or oligomer moiety of the curable coating.

The product is then placed into a fusion oven where it is heated to about 205° C. The effect is that those portions of the curable coating which do not overlie either the first or second printing ink will fluidize and relax such that the deformation of the curable coating in these areas attributable to the mechanical embossing by means of the textured roll disappear, i.e. smooth over. Additionally, that portion of the foamable plastic layer which does not underlie the second printing ink containing an inhibitor, foams and expands. Any of the monomer or oligomer left unreacted after leaving the UV enclosure can be cured by the thermal initiator optionally added to the curable coating. It is important to select this thermal initiator so that it begins to efficiently cure the unreacted monomer or oligomer after the later portions smooth over.

The product may then be subjected to a second mechanical embossing step, again by conventional techniques, wherein another texture such as the natural look of stone, wood or the like,; as hereinbefore described, is applied to the surface of the curable coating which has smoothed out. Following this step the product can optionally be coated with a performance coating such as acrylic polyurethane.

An important feature of the process and product of the present invention is that the entire surface of the product may be initially textured in the first mechanical embossing step without necessitating a special patterned texturing roller controlled in register with the design or decoration of the surface covering. This is because the surface areas of the curable coating which are not fixed after the first. mechanical embossing step will be softened during the subsequent fusion and expansion treatment and will become smooth because of heat relaxation of plastic memories as taught in U.S. Pat. No. 3,887,678.

Figure 2:
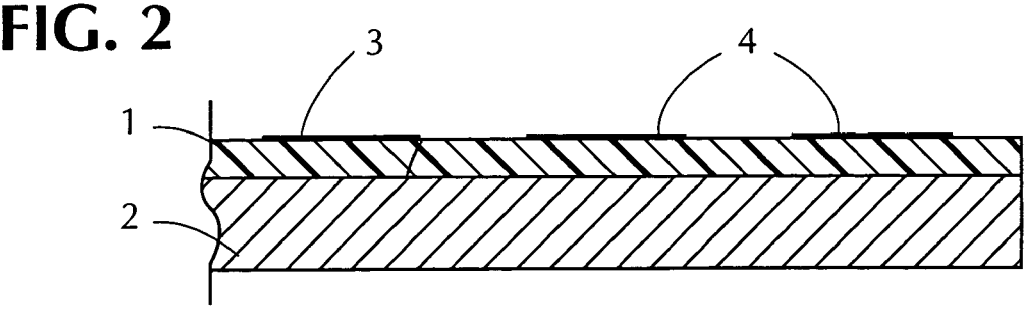
FIG. 2 is a fragmentary sectional view through a product made according to the process illustrated in FIG. 1 prior to applying a curable coating over the gelled plastic layer. This view and those of FIGS. 3 and 4 are only for illustrative purposes and it is not intended that the thickness of the various layers of components shown are drawn to scale.
Figure 3:
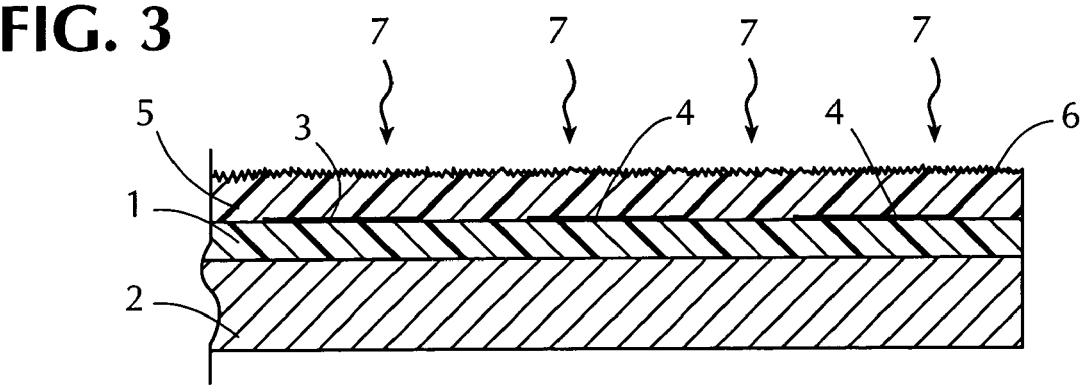
FIG. 3 is a fragmentary sectional view through a product made according to the process illustrated in FIG. 1 at the time of the UV curing step.
Figure 4:
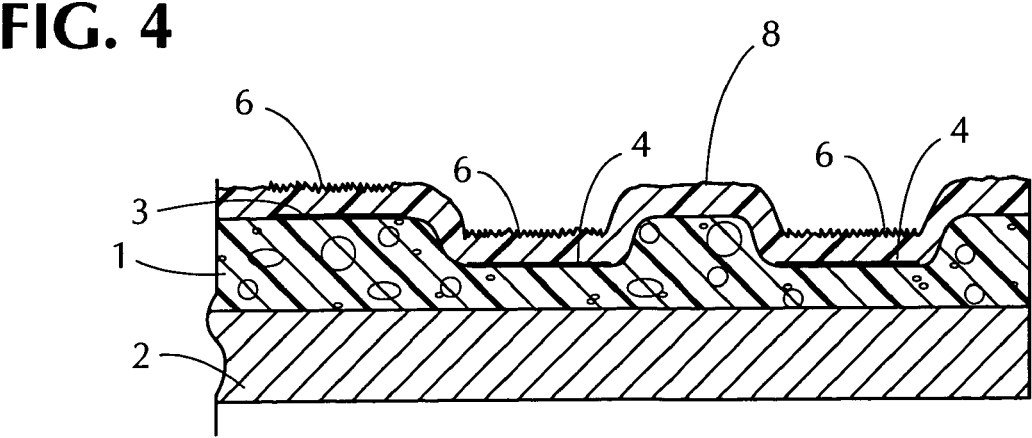
FIG. 4 is a fragmentary sectional view through a product made according to the process illustrated in FIG. 1 after the second mechanical embossing step.

A product having the construction illustrated in FIGS. 2 to 4 is prepared by the process of FIG. 1. Referring to FIG. 2, a foamable plastic layer 1 containing a foaming agent is applied over a sheet substrate 2. The combination is then heated to gel the plastic layer 1. A first printing ink 3 which contains a photoinitiator and a second printing ink 4 which contains an expansion inhibitor and a photoinitiator are applied in a first and second pattern, respectively, to gelled plastic layer 1. A clear liquid curable coating 5 (see FIG. 3) is applied over the entire surface of gelled plastic layer 1 and the first and second printing inks 3, 4. After heating the curable coating 5 to gel and soften it, the softened curable coating 5 is mechanically embossed in a first embossing step with a textured roll to create a first texture 6. The textured curable coating is then subjected to ultraviolet radiation 7 and the product fused in an oven to cause that portion of the curable coating 5 which does not overlie the printing inks 3, 4 to smooth out so that the textures attributable to the first mechanical embossing step disappear in those areas (see FIG. 4). Furthermore, those portions of the gelled plastic layer 1 which do not contain the inhibitor applied with the second printing ink 4, foam and expand thereby chemically embossing the curable coating 5 (see FIGS. 3 and 4). The surface areas of the curable coating which have smoothed out are then mechanically embossed in a second embossing step to create a second texture 8. The product may then be optionally coated with a performance coating (not shown).

In another embodiment of the invention we make use of UV curing radiation from two distinctly different spectral regions. This permits us to achieve selective cross-linking in the wear layer through the use of different photoinitiators. The photoinitiators differ in their UV absorption region. A first photoinitiator, which is used in the printing ink, must have sufficient absorption in the region above 350 nanometers ("nm") and preferably above about 400 nm. The second photoinitiator, which is used in the wear layer formulation, cannot have any absorption in the same region as the first photoinitiator. Accordingly, the second photoinitiator will react in the region below about 350 nm and preferably below about 320 nm.

Radiation above 350 nm can be obtained by selecting from any of the available bulb types (V-bulb (Gallium doped), D-bulb, H-bulb, etc.). For purposes of efficiency, the bulb that is chosen should be one that has significant emissions in the spectral region >350 nm. The V-bulb is preferred as this bulb's emissions are maximized in the region over 350 nm and minimized in the region below.

To segregate the emissions in the region above 350 nm from the full bulb emissions, it is necessary to filter the lamp emissions below 350 nm. A glass plate filter can be used that absorbs radiation below a wavelength of approximately 350 nm and transmits the radiation above that wavelength. It is also necessary to maintain the glass at a low and controlled temperature since it needs to be placed stationary below the UV bulb which generates significant infrared radiation (IR). A preferred method is to make use of dichroic reflectors.

Each component of the product and each step of the process of the invention will now be described with reference to various preferred and alternative embodiments.

The Substrate

The substrate is a relatively flat, fibrous or non-fibrous, backing sheet material, such as a fibrous, felted or matted, relatively flat sheet of overlapping, intersecting fibers. The substrate can, if desired, comprise felts or papers which are woven or non-woven. It can comprise knitted or otherwise fabricated textile material or fabrics made from cellulose, glass, natural or synthetic organic fibers, or natural or synthetic inorganic fibers, or supported or non-supported webs or sheets made therefrom, or filled or unfilled thermoplastic or thermoset polymeric materials. It can also comprise a compact layer. These and other substrate base materials are well known in the art and need not be further detailed here.

The Foamable Plastic Layer

The foamable plastic layer, when used, can be comprised of any suitable material known in the art for producing foamed plastic layers on a substrate, but is typically a polyvinylchloride ("PVC") plastisol, an organosol, a polyolefin, an ionomer, plasticized PVC or thermoplastic rubber. This layer can be pigmented or free of pigmentation. If the layer is pigmented, a color is preferably selected which is the average of the colors of the end product so that the appearance and aesthetics of the product are maintained during its working life. To one skilled in the art, the average color means the color perceived when one looks at a surface from a distance of more than about five feet.

The foamable plastic layer may include any of the various PVC resin materials normally used in connection with coating of decorative sheet materials and may specifically include, but are not limited to, those described in U.S. Pat. No. 3,458,337. While a suitable foaming agent or blowing agent as taught by the above-mentioned patent may be used, a blend of azodicarbonamide ("ABFA") and p,p'oxybis (benzene sulfonyl hydrazide) ("OBSH") foaming agents can be used instead. Additional conventional ingredients such as stabilizers, foaming or blowing agent catalysts, etc. can be used, of course the catalyst is required if chemical inhibition is required. Although the preferred foamable plastic layer is a PVC homopolymer resin, other vinyl chloride resins can be employed. Other synthetic resins are suitable such as polystyrene, substituted polystyrene (preferably wherein the substituents are selected from the group consisting of alkyl having 1–10 carbons, preferably 1–4 carbons, and aryl having 6–14 carbons), polyolefins such as polyethylene and polypropylene, acrylates and methacrylates, polyamide, polyesters and any other natural or synthetic resin.

The composition of the foamable plastic layer must be compatible with the underlying substrate and the printing inks and, when gelled, must provide a smooth and uniform surface for the first and second printing inks. The composition also must be otherwise compatible with the overall product composition and, therefore, within the principles of this invention. As indicated, it is not essential that a plastisol be used as the foamable plastic layer. Organosols and aqueous latexes are also of use, employing as the dispersing or suspending media, organic solvents and water, respectively, rather than plasticizers as in the case of a plastisol.

The foamable plastic layer is substantially uniformly applied in its liquid state to the underlying substrate by conventional means such as a knife-over roll coater, direct roll coater, rotary screen, draw down bar, reverse roll coater or wire wound bar. The particular means for applying the foamable plastic layer does not relate to the essence of the invention, and any suitable coating means can be employed.

The thickness of the foamable, liquid plastic layer as it is applied to the underlying surface is substantially uniform and is in the range from about 2 to about 30 mils, preferably from about 6 to about 16 mils. The layer can be thicker or thinner as may be required by the particular product application.

Instead of a foamable plastic layer, a plastic layer which does not contain a foaming or blowing agent can be applied to the underlying substrate in the same manner as described above.

Gelling

After the foamable, liquid, plastic layer containing a foaming agent is applied over the substrate, the combination is heated for a period of time and at a temperature sufficient to gel the plastic layer, but not sufficient to activate or decompose the blowing or foaming agent. This can be done in an oven or on a heated chrome drum. If an oven is used for the gelling step, a residence time in the oven from about 0.5 minutes to about 3.5 minutes at an oven temperature from about 80° C. to about 205° C. will give good results. If a chrome drum is used, a dwell time on the drum from about 8 seconds to about 30 seconds at a drum temperature of from about 80° C. to about 175° C. will give good results. The higher temperatures are used with shorter residence or dwell times and lower temperatures with longer times. The layer is then cooled to provide a surface suitable for printing. Cooling is generally accomplished by contacting the surface of the foamable, gelled plastic layer (and sometimes the underside of the substrate) with one or more cooling drums. Ambient or chilled water is circulated through the drums. Cooling may be enhanced with the use of fans or blowers. The same gelling process can be employed if the plastic layer does not contain a foaming or blowing agent as will be apparent to those skilled in the art. Also calendering or extrusion techniques followed by lamination onto a substrate of a sheet of similar formulations as above can be used to prepare the printable layer.

The Printing Inks

In the foregoing preferred embodiment, a first printing ink containing a photoinitiator is applied in a first pattern or design onto the gelled plastic layer. Then, a second printing ink containing a photoinitiator and an expansion inhibitor is applied in a second pattern or design onto the gelled plastic layer. Suitable printing inks include those normally used in the manufacture of surface coverings. These include plastisol, solvent-based systems and water-based systems. Of course, other printing inks which do not contain a photoinitiator or an expansion inhibitor can be applied to obtain design objectives. Furthermore, it is not necessary to employ both the first and second printing inks as long as at least one printing ink with a photoinitiator is employed. Either ink can be employed alone or in combination with other printing inks which do not contain a photoinitiator or an expansion inhibitor. If no foamable plastic layer is employed then inks having an expansion inhibitor are not employed.

The first, second and other printing inks may be pigmented or non-pigmented and may include organic pigments or inorganic pigment particles such as titanium dioxide, iron oxide, carbon black, mica, pearlescent and the like. Decorative reflective particles such as metallics, may also be included as part of one or more printing ink compositions. The types and components of the first, second and other printing inks can be the same or different.

The first and second printing inks contain a photoinitiator. By way of example only, and not by limitation, the following ultraviolet crosslinking initiators may be used in accordance with the present invention: benzophenone, 2-chloro-thioxanthone, 2-methyl-thioxanthone, 2-isopropyl-thioxanthone, benzoin, 4,4'-dimethoxybenzoin, benzoin ethyl ether, benzoin isopropyl ether, benzyldimethylketal, 1,1,1-trichloroacetophenone, 1-phenyl-1,2-propaned ione-2-(ethoxycarbonyl)-oxide, diethoxyacetophenone, and dibenzosuberone. The inks containing the photoinitiators should contain about 1% to about 15%, preferably about 10% by weight of photoinitiator.

The second printing ink also contains an expansion inhibitor. By way of example only, and not by limitation, the following inhibitors may be used in accordance with the present invention: benzotriazole, tolyltriazole, fumaric acid and trimellitic anhydride. The specific expansion inhibitor which is used does not relate to the essence of the present invention and many other suitable and acceptable expansion inhibitors are available to one of ordinary skill in the art.

Printing of the inks onto the gelled plastic layer can be effected by rotogravure, flexigraphic, screen printing, pad or knurled printing, or other printing techniques conventionally employed in making floor or wall covering products.

When the second printing ink is applied to the gelled plastic layer, the inhibitor present in the second printing ink migrates into the gelled plastic layer beneath the second printing ink.

It will be appreciated that in the present invention that one ink, two inks or multiple inks may be used to print patterns or designs on the substrate or on the gelled plastic layer. Each ink may optionally contain a photoinitiator and/or an inhibitor. Of course ink without photoinitiators or inhibitors can be used to obtain design objectives. It will also be appreciated that the order of printing is not critical and is not to be construed as a limitation of the invention. Furthermore, it is to be understood that the print areas of the inks may overlap.

When UV curing radiation from two different spectral regions is to be used, the printing ink (with or without a foam inhibitor) is formulated with a photoinitiator that absorbs UV radiation in the spectral region above 350 nm. Suitable photoinitiators are commercially available and they include, but are not limited to, the following:

IRGACURE 784
IRGACURE 819
IRGACURE 1700
IRGACURE 1800
IRGACURE 1850
DAROCUR 4265

In experimental work, photoinitiators were employed at a concentration of 20% in the printing ink, but higher or lower concentrations can be employed to obtain effective results as will be apparent to those having skill in the art as it is well known to apply by printing a defined quantity of reagent onto a surface through the use of a defined gravure printing an ink containing a defined concentration of the reagent. Effective results are attained when a sufficient quantity of photoinitiator is applied with the printing ink to cause the photoinitiator to migrate into the curable coating and have a result effective effect. The range of concentrations that will be sufficient is based in part on the number of lines per inch etched into the print cylinder. The range of lines per inch is generally from about 80–220 and preferably from about 90–130. The range of sufficient concentrations of photoinitiators in the printing ink is generally from about 5% to about 30% but smaller amounts may be effective and larger amounts may be used depending upon the particular application.

The Curable Coating

After the printing inks have been applied to the gelled plastic layer, a liquid curable coating containing a crosslinkable photopolymer or monomer, such as an acrylic monomer or oligomer, and optionally a thermal crosslinking initiator, is applied over the entire surface of the gelled plastic layer including over the first and second printing inks. In the preferred embodiment, the photoinitiators residing in the first and second printing inks then migrate into that portion of the curable layer which was applied over the first and second printing inks. The curable layer may comprise a plastisol and, as used herein, the term "plastisol" is generally intended to cover a relatively high molecular weight polyvinylchloride ("PVC") resin dispersed in one or more plasticizers. A plastisol upon heating or fusing forms a tough plasticized solid. For purposes of this specification, plastisol compositions are also intended to include organosols. A clear calendered or extruded film of the same composition can also be used. It is adhered onto the printed gelled plastic layer by means known in the art, for example, laminating.

The thickness of the curable coating as it is applied in its liquid, tacky, ungelled state to the gelled plastic layer and inks is substantially uniform and is in the range from about 2 mils to about 40 mils, preferably from about 8 mils to about 20 mils. The coating can be thinner or thicker as may be required by the particular product application. The curable coating is applied by conventional means such as described above with respect to application of the foamable plastic layer. The particular means for applying the curable coating does not relate to the essence of the invention and any suitable coating means can be employed.

The curable coating is preferably a clear (transparent) layer but it can be slightly tinted as long as it remains translucent and allows UV penetration. The curable coating may also contain solid particulates such as chips, flakes, flitters, etc.

By way of example only, cross-linkable monomers suitable for use in connection with the present invention include, but are not limited to, the following compounds: ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethavrylate, tetraethylene diacrylate, polyethylene glycol dimethacrylate, polyethylene glycol diacrylate, 1,3-butylene glycol dimethacrylate, 1,4-butylene glycol dimethacrylate, 1,3-butylene glycol diacrylate, 1,4-butylene glycol diacrylate, 1,6-hexanediol dimethacrylate, 1,6-hexanediol diacrylate, neopentyl glycol diacrylate, neopentyl glycol dimethacrylate, (ethoxylated) bis-phenol A dimethacrylate, divinylbenzene, divinyltoluene, trimethylolpropane trimethacrylate, trimethylolpropane triacrylate, pentaerythritol triacrylate, glyceryl trimethacrylate, pentaerythritol tetracrylate and pentaerythritol tetramethacrylate.

The curable coating containing a crosslinkable reagent, monomer and/or oligomer should contain 2 to 40%, preferably about 10% by weight of monomer.

By way of example only, cross-linkable oligomers suitable for use in connection with the present invention include, but are not limited to the oligomers described in U.S. Pat. No. 6,146,711.

Top Coat Wear Layer

This layer is usually used in the embodiment which employs UV curing radiation from two different spectral regions, but it can be used in other embodiments as will be apparent from the examples below. When the formulation is used in the embodiment which employs two different UV spectral regions, it includes a photoinitiator that does not have any appreciable absorption in the spectral region above 350 nm. Suitable photoinitiators are commercially available and they include, but are not limited to, IRGACURE 184 and IRGACURE 2959. A water-based UV curable urethane is employed. It is applied to the surface of the gelled curable coating (also referred to as a base wear layer in this embodiment) and dried to form a film that can be mechanically embossed. Examples of suitable coatings include Stahl TRL 101 and Stahl TRL 248.

Heating and First Embossing Step

To prepare the curable coating for mechanical embossing, the curable coating is gelled by heating. The product is passed through an oven maintained at a temperature from about 70° C. to about 170° C., preferably from about 135° C. to about 160° C., for a residence time from about 0.75 to 3 minutes. A hot air recirculating oven and/or an infrared ("IR") oven operated at these temperatures is generally employed. The product surface is then softened by heat, preferably by means of an IR oven, to a temperature from about 150° C. to 170° C., preferably about 160° C., as measured by a pyrometer, before the embossing rollers nip.

It is understood throughout the specification, including the examples and the claims of the present application that the step of mechanical embossing always includes some form of heating to soften the surface before subjecting it to the embossing rollers to attain the desired mechanically embossed texture. Mechanical embossing is applied to previously gelled smooth and solidified material which is subsequently surface heated before it is subjected to the embossing rollers.

Once the curable coating has been adequately softened, it is mechanically embossed by means of a textured roll which imitates the texture of sand, cementitious grout, mortar or the like as hereinbefore described. The textured roll operates under a pressure that depends upon the degree of texturing desired as is known by a person having ordinary skill in the art.

Ultraviolet ("UV") Curing

The product may be cooled before it is UV cured. It is not a requirement but it reduces the fumes in the UV enclosure which would reduce the UV transference to the product. Once the first embossing step has been completed, the product enters an enclosure where it is subjected to the emissions of a UV lamp to cross-link that portion of the curable coating overlying the first and second printing inks containing a photoinitiator. This step fixes the embossed texture into the surface areas of the plastisol disposed over the ink containing the photoinitiator.

The UV curing step can occur in a UV reactor wherein the product is subjected to about 100 to about 1500 millijoules per square centimeter (mJ/sq. cm.), preferably about 1000 mJ/sq. cm., of focused or diffused UV radiation, preferably focused radiation, at about 100 to about 400 watts per inch of adjustable power using H-type, V-type, or D-type bulbs, preferably H-type bulbs. Such a UV reactor is available from IST (Germany).

As described above, some embodiments of the invention employ UV radiation from two different spectral regions. Examples of these embodiments are provided in detail below.

Fusion and Expansion

After portions of the curable coating have been cured in the above-described enclosure, the product obtained therefrom is introduced to a fusion oven maintained at a temperature from about 175° C. to about 220° C., preferably about 205° C. The product has a residence time in the oven from about 1 to about 3 minutes. A hot air recirculating oven and/or an IR oven operated at these temperatures is generally employed.

Subjecting the product to these temperatures for this period of time fuses the substrate, the plastic layer, the printing inks and the curable coating together and foams and expands those portions of the foamable plastic layer which do not underlie the second printing ink which contains an inhibitor, thereby chemically embossing the curable coating. Furthermore, those portions (i.e., surface areas) of the curable coating which were not previously cured, i.e., do not overlie either the first or second printing inks, will relax such that the deformation and texturing in the still curable coating in these areas attributable to the first mechanical embossing step to this portion disappear, i.e. smooth over. More particularly, during this step that portion of the curable coating which has not been cured (crosslinked) during UV exposure undergoes relaxation which has the effect of smoothing the textured surface, while that portion of the curable coating that has been cured during UV curing retains its textured appearance. This relaxation phenomenon is one that requires the first overall embossing to be conducted at a temperature as low as possible to minimize the plastic component of the mechanical deformation induced in the curable coating by the embossing roll.

Second Embossing Step (Optional)

After being removed from the fusion oven, those portions of the curable coating (now the cured coating) which do not overlie the printing inks and hence have smoothed out, are mechanically embossed a second time by means, known to those of ordinary skill in the art, such as a texture roll, or other conventional means containing textures such as the natural looking texture of stone, wood or the like as heretobefore described.

Performance Coating

After fusion and expansion or after the optional second mechanical embossing step is completed, the product is cooled to from about 15° C. to about 80° C. by conventional means such as air or water cooled drums. Then a performance coating such as acrylic polyurethane can optionally be applied to the product by such conventional means as print cylinders, roller coaters and the like.

The following non-limiting examples provide particular and preferred embodiments of the process and product of the present invention.

Use of Calendered or Extruded Layers

As noted above, calendered or extruded sheets can be employed as layers in place of any one or both of the foamable layer and/or curable layer. When a foamable sheet is employed it is formed by calendering or an extrusion die at a temperature below the decomposition temperature of the foaming or blowing agent, or the catalyzed foaming or blowing agent. When a sheet is used in place of the curable layer, it is processed by calendering or an extrusion die under conditions which do not significantly decompose the peroxide, so that it remains a curable layer. When sheet materials are used they are laminated to the underlying surface of the product by employing techniques known by those having ordinary skill in the art.

EXAMPLE 1

A ceramic pattern having grout lines was printed on a foamable base. In the grout lines of the pattern the ink printed therein contained an inhibitor and a photoinitiator (P1). A 0.010 inch thick coating was applied of a clear plastisol (A1) containing a curable acrylic monomer and another radical generator (peroxide) to heat set the free monomer left unreacted when the product left the UV reactor.

The plastisol (A1) was heated to a temperature of 150° C. to gel. Following gelling the surface was heated with IR to 160° F. to soften the surface for mechanical embossing. Then the entire surface of the product was mechanically embossed with a sandy textured roll (E1).

To fix the embossed texture in the plastisol wear layer area overlaying the ink (P1), the gelled surface of the product was subjected to UV radiation at an irradiation of 1000 mJ/sq. cm., H type bulb, to crosslink the monomer.

To create a relief, the product was conveyed into a fusion oven where it was heated to 205° C. for 2 minutes to blow the foamable layer and create depressions in the areas printed with P1 ink. The areas of the embossed and crosslinked plastisol wear layer disposed over the printed grouts kept the texture as fixed by the UV processing and the remainder of the surface was smoothed out by relaxation.

This process made a grout appearance imitating the three-dimensional texture of a real cementitious grout. Furthermore, as a printing technique was used to locate the texture, the product was consequently embossed in register.

After the product was fused, another texture was applied by mechanical embossing of the raised portions of the product. Optionally, the product then can be coated with a polyurethane which can be cured by heat or by UV radiation. To apply this coating in a thin layer, the use of an air knife will maintain the initial texture of the uncoated product. The product is then cooled and rolled.

In this example the ink formulation (P1) was as follows:

| Ingredients | Quantity (parts by weight) |
| --- | --- |
| Clear vehicle | 82 |
| Inhibitor (tolyltriazole) | 10 |
| Photoinitiator (IRGACURE 2959) | 8 |
| Color | Following the pattern |
| The wear layer formulation (A1) was as follows: | |
| SANTICIZER 377 | 400 |
| TXIB | 45 |
| SARTOMER SR-350 | 110 |
| DICUP (10% solution in SANTICIZER 377) | 21 |
| Heat stabilizer | 98 |
| Extender PVC | 136 |
| Paste PVC (75 Kv) | 930 |

EXAMPLE 2

A ceramic/slate pattern having grout lines was printed on a foamable base. In the grout lines of this pattern the ink contained an inhibitor and in the slate area a full tone was printed with an ink containing a photoinitiator (P2). A 0.014 inch thick coating of a clear plastisol (A2) was applied containing a curable acrylic monomer and another radical generator (peroxide) to heat set the free monomer left unreacted when the product leaves the UV reactor. Then the process of Example 1 was followed but using an embossing roll (E2) that had a slate texture instead of the sandy texture (E1). After the product was fused and blown, it was cooled and rolled. The slate texture was only disposed over the areas of the product having the slate print. This gave a better rendering of the original assembly of slate and ceramic.

In this example the wear layer formulation (A2) was as follows:

| Ingredients | Quantity (parts by weight) |
| --- | --- |
| SANTICIZER 377 | 400 |
| TXIB | 45 |
| SARTOMER SR-350 | 220 |
| DICUP (10% solution in SANTICIZER 377) | 21 |
| Heat Stabilizer | 98 |
| Extender PVC | 136 |
| Paste PVC (70 Kv) | 930 |

EXAMPLE 3

An old ceramic look pattern was printed on a foamable base. In the grout parts of this pattern the ink contained an inhibitor and a photoinitiator (P1) and in some fields of the ceramic the ink contained a photoinitiator (P2). A 0.020 inch thick coating of a clear plastisol (A3) was applied containing a curable acrylic monomer and another radical generator (peroxide) to heat set the free monomer left unreacted when the product left the UV reactor. Then the process of Example 1 was followed using the sandy texture (E1). After the product was fused and blown, the product was cooled and rolled. The appearance of the product was like an old ceramic floor with worn surfaces by spots with a three-dimensional cementitious grout.

In this example the wear layer formulation (A3) was as follows:

| Ingredients | Quantity (parts by weight) |
| --- | --- |
| SANTICIZER 377 | 400 |
| TXIB | 45 |
| SARTOMER SR-350 | 220 |
| DICUP (10% solution in SANTICIZER 377) | 21 |
| Heat Stabilizer | 98 |
| Extender PVC | 136 |
| Paste PVC | 930 |

EXAMPLE 4

On a flat compact base a wood pattern was printed comprising planks with ticking and joint lines. In the joint lines and in the ticking parts of this pattern the ink contained a photoinitiator (P2). A 0.004 inch thick coating was applied of a clear plastisol (A4) containing a curable acrylic monomer and oligomer and another radical generator (peroxide) to heat set the free monomer and oligomer left unreacted when the product left the UV reactor. Then the process of Example 1 was followed but using an embossing roll (E3) that had a flat, dull texture instead of the sandy texture (E1). After the product was fused, the product was cooled and rolled. The product had the appearance of a more realistic wood parquet when compared with a laminated wood parquet.

In this example the wear layer formulation (A4) is as follows:

| Ingredients | Quantity (parts by weight) |
| --- | --- |
| STAHL U26253 | 75 |
| SARTOMER SR-209 | 550 |
| DICUP (10% solution in SARTOMER SR-209 | 20 |
| Heat Stabilizer | 60 |
| Paste PVC (75 Kv) | 1000 |

EXAMPLE 5

A foamable plastic layer containing a foaming agent was applied over a sheet substrate. The combination was then heated to gel the plastic layer without activating the foaming agent. A printing ink containing a photoinitiator (a light activated crosslinking initiator) which reacts when exposed to UV radiation, was then applied in a pattern on the gelled plastic layer. Following the printing step, a liquid curable coating base wear layer made from a clear PVC plastisol or organosol, and optionally containing a UV curable photopolymer, was applied over the entire surface of the gelled plastic layer, including the printing ink, whereupon a portion of the photoinitiator in the printing ink migrated into the base wear layer above the printing ink. The product was then heated to gel the base wear layer, again without activating the foaming agent in the foamable plastic layer. After this gelling step, a top coat wear layer made of a UV curable, waterborne polyurethane free of photoinitiator was applied over the entire surface of the gelled base wear layer whereupon a portion of the photoinitiator in the base wear layer migrates into the top coat wear layer. The top coat wear layer was subsequently dried by forced heated air to drive off the water carrier, leaving a polyurethane coating film across the surface of the gelled base wear layer of PVC plastisol.

The composite wear layer, comprising the PVC plastisol base wear layer plus the polyurethane coating film, was then heated to soften the base wear layer and then mechanically embossed overall with a first mechanical embossing texture, such as that of sand. Thereafter the product was cured by exposure, within an enclosure, to UV radiation to cure and set the texture in those portions of the PVC plastisol base wear layer which contain the UV curable photopolymer, and the polyurethane coating film containing the photoinitiator (i.e., those portions of the base wear layer (optionally containing the photopolymer) and polyurethane coating film overlying or on top of the printing ink containing the photoinitiator). Upon exiting the UV enclosure, the product entered a fusion and expansion oven whereupon the product was fused, the foamable plastic layer was blown (foamed), and that portion of the composite wear layer not containing the photoinitiator (i.e., those portions of the composite wear layer not overlying or on top of the printing ink containing the photoinitiator) smooths out such that the texture imparted by the first mechanical embossing step disappeared in those areas. The composite wear layer comprising the fused PVC plastisol base wear layer and the polyurethane coating film is then optionally mechanically embossed by a second mechanical embossing step, but now with a texture which imitates the natural texture of stone, ceramic, wood or the like. Thereafter, the polyurethane coating film of the product was coated with a solution of alcohol and a photoinitiator which reacts when exposed to UV radiation. The product was then dried in an oven with forced air to evaporate the alcohol. The product was then again cured by exposure, within an enclosure, to UV radiation to crosslink the polyurethane coating film and the base wear layer if the base wear layer contains the UV curable photopolymer.

EXAMPLE 6

A foamable plastic layer containing a foaming agent was applied over a sheet substrate. The combination was then heated to gel the plastic layer without activating the foaming agent. A printing ink containing a first photoinitiator which reacts when exposed to UV radiation having a wavelength above 400 nm was then applied in a pattern on the gelled plastic layer. Following the printing step, a liquid curable coating base wear layer made from a clear PVC plastisol or organosol and optionally containing a UV curable photopolymer was applied over the entire surface of the gelled plastic layer, including the printing ink, whereupon a portion of the photoinitiator in the printing ink migrated into the base wear layer above the printing ink. The product was then heated to gel the base wear layer, again without activating the foaming agent in the foamable plastic layer. After this gelling step, a top coat wear layer made of a UV curable, waterborne polyurethane containing a second photoinitiator which reacts when exposed to UV radiation having a wavelength below 350 nm, e.g., Irgacure IR 184, was applied over the entire surface of the gelled base wear layer whereupon a portion of the first photoinitiator in the base wear layer migrates into the top coat wear layer. The top coat wear layer was subsequently dried by forced heated air to drive off the water carrier, leaving a polyurethane coating film containing a first and a second photoinitiator across the surface of the gelled curable coating base wear layer of PVC plastisol.

The composite wear layer, comprising the PVC plastisol base wear layer plus the polyurethane coating film was then heated to soften the base wear layer and then mechanically embossed overall with a first mechanical embossing texture, such as that of sand, whereupon the product was cured by exposure, within an enclosure, to UV radiation having only wavelengths above 400 nm to cure and set the texture in those portions of the PVC plastisol base wear layer which contain the UV curable photopolymer, and the polyurethane coating film containing the first photoinitiator (i.e, those portions of the base wear layer (optionally containing the photopolymer) and polyurethane coating film overlying or on top of the printing ink containing the first photoinitiator). Upon exiting the UV enclosure, the product entered a fusion and expansion oven whereupon the product was fused, the foamable plastic layer was blown (foamed), and that portion of the composite wear layer which did not contain the first photoinitiator smoothed out such that the texture imparted by the first mechanical embossing step disappeared in those areas. The composite wear layer comprising the fused PVC plastisol base wear layer and the polyurethane coating film was then optionally mechanically embossed by a second mechanical embossing step, but now with a texture which imitates the natural texture of stone, ceramic, wood or the like. Thereafter the product was again cured by exposure, within an enclosure, to UV radiation to cross-link the yet uncured polyurethane coating film by reacting with the second photoinitiator, and the base wear layer if the base wear layer contains the UV curable photopolymer.

EXAMPLE 7

A foamable plastic layer containing a foaming agent is applied over a sheet substrate. The combination is then heated to gel the plastic layer without activating the foaming agent. A printing ink containing a first photoinitiator which reacts when exposed to UV radiation having a wavelength of about 400 nm is then applied in a pattern on the gelled plastic layer. Following the printing step, a liquid curable coating base wear layer made from a clear PVC plastisol or organosol, and optionally containing a UV curable photopolymer, is applied over the entire surface of the gelled plastic layer, including the printing ink, whereupon a portion of the photoinitiator in the printing ink migrates into the base wear layer above the printing ink. The product is then heated to gel the base wear layer, again without activating the foaming agent in the foamable plastic layer. After this gelling step, a top coat wear layer made of a UV curable, 100 percent reactive polyurethane containing a second photoinitiator which reacts when exposed to UV radiation having a wavelength below 350 nm, is applied over the entire surface of the gelled base wear layer whereupon a portion of the photoinitiator in the base wear layer migrates into the top coat wear layer. The top coat wear layer is subsequently dried under nitrogen blanketing with the minimum energy necessary to solidify to dry touch state the polyurethane coating now containing the first and second photoinitiator. If too much curing energy is given, i.e. the coating is too highly cured, the PU coating will wrinkle under the next step of submitting the product to the IR preceding the mechanical embossing with a texture like sand. The same will then also happen in the fusion oven used for the expansion of the foamable layer.

The composite wear layer, comprising the PVC plastisol base wear layer containing the first photoinitiator plus the polyurethane coating containing the first and the second photoinitiator, is then heated to soften the base wear layer and then mechanically embossed overall with a first mechanical embossing texture, such as that of sand, whereupon the product is cured by exposure, within an enclosure, to UV radiation having only wavelengths above 400 nm to cure and set the texture in those portions of the PVC plastisol base wear layer, which contain the UV curable photopolymer, and the polyurethane coating overlying the printing ink and containing the first photoinitiator. Upon exiting the UV enclosure, the product enters a fusion and expansion oven whereupon the product is fused, the foamable plastic layer is blown (foamed), and that portion of the composite wear layer which does not contain the first photoinitiator smooths out such that the texture imparted by the first mechanical embossing step disappears in those areas. The composite wear layer comprising the fused PVC plastisol base wear layer and the polyurethane coating is then optionally mechanically embossed by a second mechanical embossing step, but now with a texture which imitates the natural texture of stone, ceramic, wood or the like. Thereafter the product is again cured by exposure, within an enclosure, to UV radiation to crosslink the polyurethane coating film which did not react upon exposure to the UV radiation having wavelengths above 400 nm, and the base wear layer if the base wear layer contains the UV curable photopolymer.

EXAMPLE 8

A foamable plastic layer containing a foaming agent was applied over a sheet substrate. The combination was then heated to gel the plastic layer without activating the foaming agent. A printing ink containing a photoinitiator which reacts when exposed to UV radiation was then applied in a pattern on the gelled plastic layer. Following the printing step, a liquid curable coating base wear layer made from a clear PVC plastisol or organosol and optionally containing a UV curable photopolymer was applied over the entire surface of the gelled plastic layer, including the printing ink, whereupon a portion of the photoinitiator in the printing ink migrated into the base wear layer above the printing ink. The product was then heated to gel the base wear layer, again without activating the foaming agent in the foamable plastic layer. After this gelling step, a top coat wear layer made of a UV curable, waterborne polyurethane was applied over the entire surface of the gelled base wear layer whereupon a potion of the photoinitiator in the base wear layer migrated into the top coat wear layer. The top coat wear layer was subsequently dried by forced heated air to drive off the water carrier, leaving a polyurethane coating film across the surface of the gelled base wear layer of PVC plastisol.

The composite wear layer, comprising the PVC plastisol base wear layer plus the polyurethane coating film was then heated to soften the base wear layer and then mechanically embossed overall with a first mechanical embossing texture, such as that of sand, whereupon the product was cured by exposure, within an enclosure, to UV radiation to cure and set the texture in those portions of the PVC plastisol base wear layer which contained the UV curable photopolymer, and the polyurethane coating film containing the photoinitiator (i.e., those portions of the base wear layer (containing the photopolymer) and polyurethane top coat overlying or on top of the printing ink). Upon exiting the UV enclosure, the product entered a fusion and expansion oven whereupon the product was fused, the foamable plastic layer was blown (foamed), and that portion of the composite wear layer not containing the photoinitiator (i.e, those portions of the composite wear layer not overlying or on top of the printing ink) smoothed out such that the texture imparted by the first mechanical embossing step disappeared in those areas. The composite wear layer comprising the fused PVC plastisol base wear layer and the polyurethane coating film was then optionally mechanically embossed by a second mechanical embossing step, but now with a texture which imitates the natural texture of stone, ceramic, wood or the like. Thereafter, the uncured portions of the composite wear layer were cured by exposing the product to an electron beam curing unit rated at 200 KV with an energy dose of 3 mega rads to crosslink the polyurethane coating film and the base wear layer if the base wear layer contains the UV curable photopolymer.

EXAMPLE 9

A foamable plastic layer containing a foaming agent was applied over a sheet substrate. The combination was then heated to gel the plastic layer without activating the foaming agent. A printing ink containing a photoinitiator synergist was then applied in a pattern on the gelled plastic layer. A photoinitiator synergist is a product that in combination with a photoinitiator will increase the conversion rate of the photopolymer. e.g., ITX or EDB synergists in combination with Esacure 1001 (from Lombardi). Following the printing step, a liquid curable coating wear layer made from a clear PVC plastisol or organosol and containing a photoinitiator, sensitive to the photoinitiator synergist, which both react to UV radiation and also containing a UV curable photopolymer, was applied over the entire surface of the gelled plastic layer, including the printing ink, whereupon a portion of the photoinitiator synergist in the printing ink migrated into the wear layer above the printing ink. The product was then heated to gel the wear layer without activating the foaming agent in the foamable plastic layer.

After this gelling step, the wear layer was heated to soften it and then mechanically embossed overall with a first mechanical embossing texture, such as that of sand, whereupon the product was cured by exposure, within an enclosure, to UV radiation under such energy to only cure and set the texture in those portions of the PVC plastisol wear layer, overlying the printing inks containing the photoinitiator synergist. Upon exiting the UV enclosure, the product entered a fusion and expansion oven whereupon the product was fused, the foamable plastic layer was blown (foamed), and that portion of the wear layer which does not overlie the printing inks containing the photoinitiator synergist smoothed out such that the texture imparted by the first mechanical embossing step disappeared in those areas. This smoothening out defines the maximum energy that the product receives in the first UV reactor. The fused PVC coating wear layer was then optionally mechanically embossed by a second mechanical embossing step, but now with a texture which imitated the natural texture of stone, ceramic, wood or the like. Thereafter, the product was again cured by exposure, within an enclosure, to UV radiation to cure the uncured portions of the PVC wear layer.

EXAMPLE 10

A foamable plastic layer containing a foaming agent was applied over a sheet substrate. The combination was then heated to gel the plastic layer without activating the foaming agent. A printing ink containing a photoinitiator synergist was then applied in a pattern on the gelled plastic layer. Following the printing step, a liquid curable coating base wear layer made from a clear PVC plastisol or organosol and optionally containing a photoinitiator sensitive to the photoinitiator synergist which reacts to UV radiation and further containing a UV curable photopolymer was applied over the entire surface of the gelled plastic layer, including the printing ink, whereupon a portion of the photoinitiator synergist in the printing ink migrates into the base wear layer above the printing ink. The product was then heated to gel the base wear layer without activating the foaming agent in the foamable plastic layer. After this gelling step, a top coat wear layer made of a UV curable, waterborne polyurethane containing additional photoinitiator of the same type was applied over the entire surface of the gelled base wear layer whereupon a portion of the photoinitiator synergist in the base wear layer migrated into the top coat wear layer. The top coat wear layer was subsequently dried by forced heated air to drive off the water carrier, leaving a polyurethane coating film across the surface of the gelled base wear layer of PVC plastisol.

The composite wear layer, comprising the PVC plastisol base wear layer plus the polyurethane coating film, was then heated to soften the base wear layer and then mechanically embossed overall with a first mechanical embossing texture, such as that of sand, whereupon the product was cured by exposure, within an enclosure, to UV radiation to cure and under such energy to only set the texture in those portions of the PVC plastisol base wear layer which contain the UV curable photopolymer, and the polyurethane coating film overlying or on top of the printing ink containing the photoinitiator synergist. Upon exiting the UV enclosure, the product entered a fusion and expansion oven whereupon the product was fused, the foamable plastic layer was blown (foamed), and that portion of the composite wear layer not overlying or on top of the printing ink containing the photoinitiator synergist smooths out such that the texture imparted by the first mechanical embossing step disappeared in those areas. The composite wear layer comprising the fused PVC plastisol base wear layer and the polyurethane coating film was then optionally mechanically embossed by a second mechanical embossing step, but now with a texture which imitated the natural texture of stone, ceramic, wood or the like. Thereafter, the product was again cured by exposure, within an enclosure, to UV radiation to crosslink overall the polyurethane coating film and the base wear layer if the base wear layer contains the UV curable photopolymer.

EXAMPLE 11

A foamable plastic layer containing a foaming agent was applied over a sheet substrate. The combination was then heated to gel the plastic layer without activating the foaming agent. A printing ink containing a photoinitiator which reacts when exposed to UV radiation at wavelengths greater than 400 nm was then applied in a pattern on the gelled plastic layer. Following the printing step, a liquid curable coating base wear layer made from a clear PVC plastisol or organosol, was applied at a thickness of 15 mils. This base layer does not contain any UV curable photopolymer. The product was then heated to gel the base wear layer, without activating the foaming agent in the foamable plastic layer. Following this gelling step, a top coat wear layer made of a UV curable coating, e.g., waterborne polyurethane, polycarbonate, epoxy-acrylate, epoxy-methacrylate, polyester-acrylate, polyether-acrylate, (All described in UCB, Sartomer or Stahl product brochures) PVC-acrylate curable coating, containing a photoinitiator which reacts when exposed to UV radiation having a wavelength below 350 nm was applied over the entire surface of the gelled base wear layer. The top coat wear layer was subsequently solidified by forced heated air to either drive off the water carrier or to gel it, leaving a coating film across the surface of the gelled base wear layer.

The composite wear layer, comprising the base wear layer plus the UV curable polyurethane coating film, was then mechanically embossed overall with a first mechanical embossing texture, such as that of sand, whereupon the product was cured by exposure, within an enclosure, to UV radiation having wavelengths only above 400 nm to cure and set the texture in those portions of the top wear layer overlaying the print area with the first photoinitiator. The first photo initiator reacting above 400 nm migrates into the top wear layer where it cures the acrylate moieties.

Upon exiting the UV enclosure the product entered a fusion and expansion oven whereupon the product was fused, the foamable plastic layer was blown (foamed), and that portion of the composite wear layer which did not contain the first photoinitiator smoothed out such that the texture imparted by the first mechanical embossing step disappeared in those areas. The composite wearlayer comprising the fused base wear layer and the polyurethane coating film was then optionally mechanically embossed by a second mechanical embossing step, but now with a texture which imitates the natural texture of stone, ceramic, wood or the like. Thereafter, the product was again cured by exposure, within an enclosure, to UV radiation to crosslink the yet uncured polyurethane coating film by reacting with the second photoinitiator.

EXAMPLE 12

A foamable plastic layer containing a foaming agent was applied over a sheet substrate. The combination was then heated to gel the plastic layer without activating the foaming agent. A printing ink containing a photoinitiator which reacts when exposed to UV radiation was then applied in a pattern on the gelled plastic layer. Following the printing step, a liquid curable coating base wear layer made from a clear PVC plastisol or organosol, was applied at a thickness of 15 mils. This base layer did not contain any UV curable photopolymer. The product was then heated to gel the base wear layer, without activating the foaming agent in the foamable plastic layer. Following this gelling step, a top coat wear layer made of a UV curable coating e.g. waterborne polyurethane, polycarbonate, epoxy-acrylate, epoxy-metacrylate, polyester-acrylate, polyether-acrylate, (All described in UCB, Sartomer or Stahl product brochures) PVC-acrylate curable coating, containing a photoinitiator which reacts when exposed to UV radiation was applied over the entire surface of the gelled base wear layer. The top coat wear layer was subsequently solidified by forced heated air either to drive off the water carrier or to gel it, leaving a coating film across the surface of the gelled base wear layer.

The composite wear layer, comprising the base wear layer plus the UV curable coating film, was then mechanically embossed overall with a first mechanical embossing texture, such as that of sand, whereupon the product was cured by exposure, within an enclosure, to UV radiation under such energy to only cure and set the texture in those portions of the top wear layer overlying the printing inks containing the photoinitiator. (This was an unexpected result as we got a kind of amplifying curing effect on the top wear layer in the area where the photoinitiator had migrated from the ink into this top wear layer. It cured under much less energy than that determined if adding both photoinitiator quantities in the top wear layer, i.e., from the migration from the printing ink plus the photoinitiator included in this top wear layer formulation.)

Upon exiting the UV enclosure the product entered a fusion and expansion oven whereupon the product was fused, the foamable plastic layer was blown (foamed), and that portion of the composite wear layer which did not contain the first photoinitiator smoothed out such that the texture imparted by the first mechanical embossing step disappeared in those areas. The composite wearlayer comprising the fused base wear layer and the curable coating film was then optionally mechanically embossed by a second mechanical embossing step, but now with a texture which imitates the natural texture of stone, ceramic, wood or the like. Thereafter, the product was again cured by exposure, within an enclosure, to UV radiation to crosslink the yet uncured polyurethane coating film by reacting with the second photoinitiator.

In the foregoing Examples, the product of the invention also can be made by replacing the base wear layers or other layer directly under and adjacent to the polyurethane top coating with a thermoplastic layer such as the type made from polyolefins, replacing the PVC layers containing a crosslinkable photopolymer and the polyurethanes with any radiation crosslinkable clear polymer that can be used as a top wear layer. Of course, the top wear layer can be applied directly to the printed foam or to a base wear layer in accord with the foregoing examples.

A surface covering and process for its manufacture has been provided which readily avoids the problems and shortcomings associated with the prior art. The preferred embodiment has been illustrated and described. Further modifications and improvements may be made thereto as may occur to those of ordinary skill in the art and all such changes as fall within the true spirit and scope of this invention are to be included within the scope of the claims to follow.

What is claimed is:

1. A surface covering which comprises:
   (a) a substrate,
   (b) a foamed plastic layer overlaying the substrate,
   (c) a first ink containing a photoinitiator printed in a design on said foamed plastic layer, optionally a second ink containing an inhibitor printed in a design on said foamed plastic layer and, optionally, a third ink which does not contain an inhibitor or photoinitiator printed on said foamed plastic layer,
   (d) a cured coating or a cured layer containing a crosslinkable photopolymer or monomer overlaying the foamed plastic layer and first ink wherein the portion of the cured coating or the cured layer disposed over the first ink is mechanically embossed with a first mechanically embossed texture which is UV cured having relatively deep emboss depths as compared with a matting grain; the portion of the cured coating or the cured layer disposed over the optional second ink is chemically embossed and the portion of the cured coating or the cured layer that is not disposed over the first ink is not mechanically embossed with the first mechanically embossed texture.

2. The surface covering of claim 1 wherein the first ink also contains an inhibitor and the portion of the cured coating or the cured layer disposed over the first ink also is chemically embossed.

3. The surface covering of claim 1 wherein the portion of the cured coating or cured layer which is not disposed over the first ink and the optional second ink is mechanically embossed with a second mechanically embossed texture different from the first mechanically embossed texture.

4. The surface covering of claim 1 further comprising a polyurethane coating overlaying the cured coating or cured layer.

5. A surface covering which comprises:
   (a) a substrate,
   (b) a foamed and chemically embossed plastic layer overlaying the substrate,
   (c) an ink containing a photoinitiator printed in a design on said foamed plastic layer,
   (d) a cured coating or a cured layer containing a crosslinkable photopolymer or monomer overlaying the foamed plastic layer and ink wherein the portion of the cured coating or the cured layer disposed over the ink is chemically embossed and mechanically embossed with a mechanically embossed texture which is UV cured having relatively deep emboss depths as compared with a matting grain, and the portion of the cured coating or the cured layer not disposed over the ink is not mechanically embossed,
   (e) a top coat wear layer overlaying the cured coating or the cured layer and being comprised of polyurethane.

* * * * *